May 23, 1944.　　　C. C. TOELLE　　　2,349,527
TRACTOR GUIDE
Filed Dec. 1, 1941　　　2 Sheets-Sheet 2
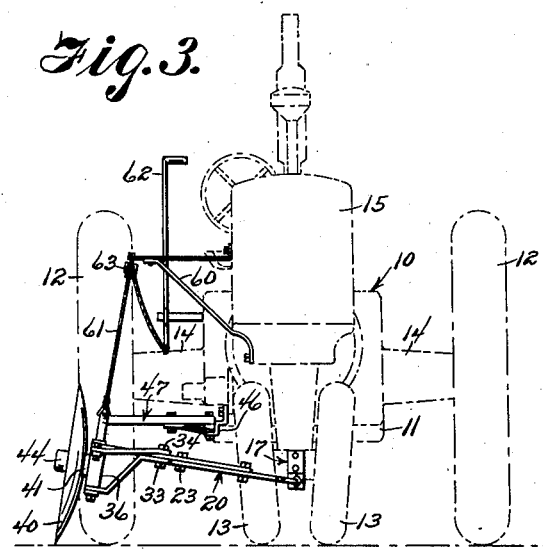
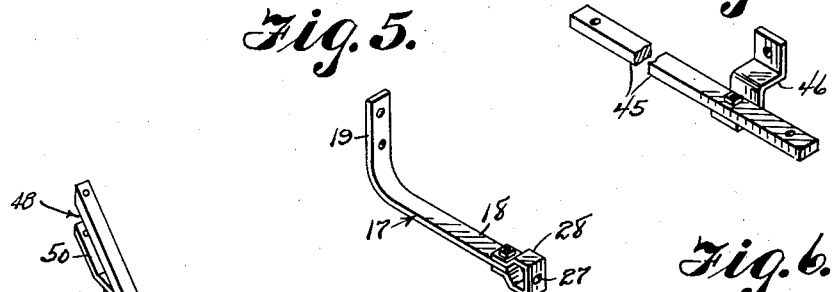
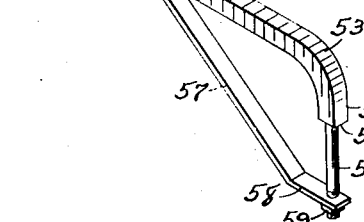
Clarence C. Toelle
INVENTOR
BY Victor J. Evans & Co.
ATTORNEYS Patented May 23, 1944

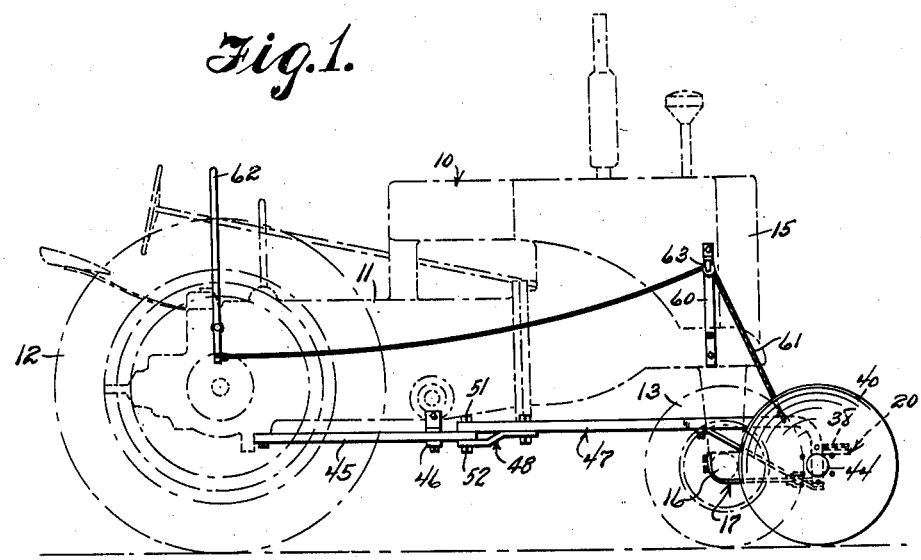
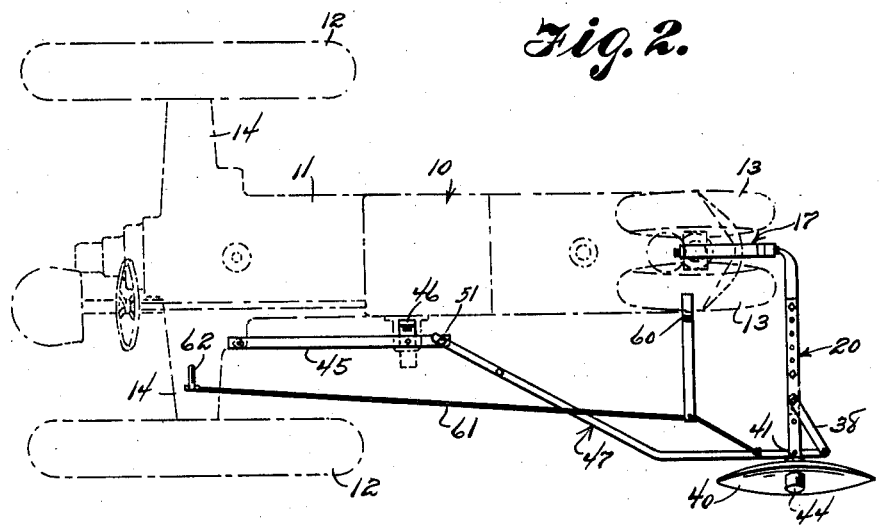

2,349,527

UNITED STATES PATENT OFFICE 2,349,527

TRACTOR GUIDE

Clarence C. Toelle, Nashua, Minn.

Application December 1, 1941, Serial No. 421,208

1 Claim. (Cl. 97—49)

My invention relates to new and useful tractor guides.

An important object of my invention is to provide a simple and novel device for facilitating the guiding of a tractor during plowing operations that is readily adaptable to the tractor and that automatically acts to direct the tractor along and laterally of the furrow.

Another object of my invention is the provision of a device of the above-mentioned character wherein the guide disk is connected to the tractor by a linkage adapted to uniquely interact to hold the guide wheels of the tractor in spaced parallel relation with the furrow regardless of whether the path traversed by the same is straight or tortuous.

Still another object of my invention is the provision of a device of the above-mentioned character wherein provision is made for adjusting the pitch of the guide disk or for tilting the same in order to compensate for the slope of the ground being plowed.

Yet another object of my invention is the provision of a device of the above-mentioned character wherein the disk may be manually elevated to an inoperative position by the operator of the vehicle, the said elevating control means being disposed in close proximity to the operator to permit him to actuate the same when seated on the driving seat of the tractor.

Other objects and advantages of my invention, will be apparent during the course of the following description.

In the drawings, forming a part of this specification, and wherein like numerals are employed to designate like parts throughout the same.

Figure 1 is a side elevation of a tractor guide embodying my invention, and showing the same operatively associated with a tractor of conventional design and construction, Figure 2 is a top plan view of the same.

Figure 3 is a front elevation thereof,

Figure 4 is a perspective view of the supporting brace embodying a part of my invention, Figure 5 is a perspective view of a steering arm embodying a part of my invention, Figure 6 is a perspective view of an adjustable link bar and axle embodying a part of my invention, and Figure 7 is a perspective view of the supporting beam embodying a part of the invention.

In the accompanying drawings, wherein for the purpose of illustration, is shown a preferred embodiment of my invention, the numeral 10 designates a tractor of conventional shape, size and construction having a supporting body 11 mounted on essentially large rear traction wheels 12 and relatively small front steering wheels 13. As illustrated in Figures 2 and 3, the rear wheels 12 are each maintained a substantial distance laterally of the tractor body by the rear axle housing 14 and the front wheels 13 are disposed in close proximity to each other and directly below the forward end of the motor 15. In the conventional tractor construction, the front wheels 13 are arranged in slight downwardly converging relation with each other and the steering apparatus of the tractor is connected to the front axle housing 16 to permit swinging of the same in a horizontal plane to turn the wheels 13 either to the right or to the left.

A tractor of this nature is frequently used for plowing and other operations. The plow is attached to the rearward end of the tractor which pulls the plow through the ground. I propose to provide a guide which may be readily attached to the tractor and which will act to automatically hold the same to a true course. The above-mentioned device includes a steering element which is adapted to travel in a preceding furrow, the element being retained in the furrow at all times and effectively frustrating any tendency of the steering wheels to swing either to the right or to the left. It is obvious that such an arrangement will greatly facilitate the work of the operator of the tractor and will permit him to keep his attention upon other duties as well as assure a uniform and proper plowing of the ground.

The guide assembly includes a steering arm 17 which comprises a metallic strip having a flat portion 18 extending between and substantially forwardly of the front wheels of the tractor and an integral upturned end portion 19 adapted to be bolted, or otherwise fixedly secured to the axle housing. It may thus be seen that the portion of the arm extending between the wheels will be positively swung angularly with the wheels and that, if the forward end thereof may be prevented from swinging, the wheels of the tractor will be prevented from turning.

The assembly further includes a link bar 20 which comprises companion sections 21 and 22. The sections are formed from metallic strips having adjacent ends disposed in overlapping relation and connected by the bolts 23 and nuts 24. The overlapping portions of the sections are provided at spaced intervals along their length with a plurality of openings 25 which permit the insertion of the bolts 23 in any selected two of the openings to longitudinally adjust the link bar. The distal end of the section 22 is formed with an integral lateral extension 26 which tapers from a rectangular formation in cross section to a circular formation in cross section which circular portion extends through an opening 27 in the base of a clevis 28 pivoted to the forward end of the steering arm. The clevis is movable about a vertical axis and the cylindrical portion of the extension 26 is screw-threaded to receive the bolts 29 which hold the same fixedly associated with the clevis but permit the link bar to be rocked about a horizontal axis. The distal end of the section 21 is provided with an angular brace 30, the middle portion of which extends angularly downwardly relative to the link bar and the opposite ends of which are formed with horizontal ends 31 and 32, the end 31 being connected to the link bar a substantial distance from its end by a bolt 33 and nut 34 and the end 32 coextending in vertically spaced parallel relation with the distal end of the link bar. An axle spindle 35 extends horizontally from a vertical tubular shank 36 which extends between the last-mentioned end of the link bar and the end 32 of the brace. The shank 36 is mounted for turning movement about a vertical axis and is provided with an integral steering arm 37 projecting laterally from the upper end of the shank and is connected to the section 21 by a brace 38. One end of the brace 38 is pivoted to the outer end of the steering arm 37 and the opposite end thereof is provided with an elongated slot 39 which receives the bolt 33. It should be noted at this point that the end 31 of the brace 30 similarly receives the bolt 33 in an elongated slot.

A disk-shaped steering element 40 is mounted for rotation on the axle spindle 35. A short hub portion 41 extends rearwardly of the disk and abuts the annular shoulder 42 formed at the juncture of the axle with the shank. The portion of the spindle extending forwardly of the disk is preferably screw-threaded, as at 43, and the retaining nut 44 is threaded thereon to securely but rotatably hold the disk associated therewith. It will be readily apparent, that by loosening the nut 34 the brace 30 may be actuated to move the lower end of the spindle 35 through a vertical plane and to angularly tilt the disk. Also, the brace 38 may be moved to rotate the shank 36 about its axis and to rock the axle through a horizontal plane to vary the pitch of the disk.

In order that the outer end of the link bar 20 may be properly supported, I provide a brace 45 which is bolted at its rear end to the rear axle housing. The brace 45 is bolted near its forward end to a bracket 46 attached to the engine body. This brace parallels the longitudinal axis of the tractor on the same side as the disk 40.

A tie 47 is connected at one end with the forward end of the brace 45 and at its outer end with the outer end of the link bar 20. A bracket 49 is secured to the tie 47 and has an end 50 spaced from the tie to provide a yoke 48 fitting over the end of the brace 45. A bolt 51 extends through openings in the yoke 48 and the brace 45 to loosely connect the tie with the brace for rocking movement in a vertical plane. A nut 52 is threaded on the bolt 51 to hold the yoke and the brace in assembled relationship. The forward end 53 of the tie is formed with a depending portion 54 which terminates in a vertical spindle bolt 55. The shoulder 56 is provided at the juncture of the depending portion 54 and the spindle 55 seats against the upper surface of the link bar 20 and the spindle bolt extends through the shank 36 and below the end 32 of the brace 30. An angular brace member 57 is bolted to the underside of the tie and extends angularly downwardly therefrom to terminate in an angular portion 58 extending under the end 32 of the brace 30 to receive the projecting end of the spindle bolt 55. The projecting end of the bolt is screwthreaded and the nut 59 is received thereby to hold the parts normally fixedly secured to each other.

A supporting bracket 60 is mounted on the forward end of the tractor body above the hereinabove-described part of the guide assembly and a rope or chain 61 connects the forward end of the tie 47 with the lower end of an operating lever 62. The lever is pivoted intermediate its ends and the rope 61 extends through a small sheave 63 carried by the supporting bracket 60, whereby angular movement of the operating handle will either tautly stretch or relax the rope to raise or lower the disk 40 relative to the ground.

It may thus be seen that the disk is adapted to travel slightly forwardly of the tractor and substantially in alignment with the postjacent traction wheel 12. The mentioned wheel 12 is adapted to run in the furrow and the disk 40 will travel in front of the traction wheel and in the same furrow. The unique manner in which the disk is attached to the tractor permits the same to extend but slightly forwardly of the tractor whereby the tractor may be easily maneuvered into fence corners and like places. After the pitch of the disk has been properly adjusted by the brace 38 and after the same has been tilted to the selected angle by the brace 30, it will efficaciously act to hold the front steering wheels of the tractor in alignment and in spaced parallel relation with the preceding furrow. After the operator of the tractor has cut the first furrow, the tractor will thereafter follow the furrow and each succeeding furrow substantially automatically, it being only necessary for the driver to operate the manual steering controls when it is desired to turn the tractor in one direction or the other. As the disk travels in the trough of the furrow, any attempt of the front wheels to turn either to the right or to the left will cause the disk to be deflected against one or the other of the side walls of the furrow. This action will, of course, turn the disk in the opposite direction and, inasmuch as the disk cannot turn without also turning the guide wheels 13, the guide wheels will be straightened in a manner to again follow the furrow.

The linkage connecting the disk and the tractor is simple in its construction and uniquely arranged to position the disk in a manner to permit the tractor to retain its necessary maneuverability. When the handle of the lever 62 is moved forwardly the lower end thereof will move rearwardly to tautly stretch the rope 61. This action will cause the rope to elevate the forward end of the tie 47 whereby the disk 40 will move to a position substantially above the ground. The bracket 49 will flex sufficiently to permit the above-described movement of the tie and the manner in which the lateral extension 26 of the link bar is connected with the clevis 28 will permit the link bar to pivot about a horizontal axis as the disk is elevated.

It is to be understood that the form of my invention, herewith shown and described, is to be taken as a preferred example of the same, and that various changes in the size, shape and arrangement of parts may be resorted to without departing from the spirit of my invention, or scope of the appended claim.

Having thus described my invention, I claim:

In guide apparatus for a tractor, a steering arm secured to and projecting forwardly of the front wheel turning mount of the tractor, a link bar extending transversely of the tractor having its inner end pivotally connected to said arm, a brace attached to the outer portion of the link bar and disposed to provide a pair of spaced parallel apertured bearings in conjunction with the link bar, a tubular member mounted between and having its bore in alignment with the bearing openings of said spaced bearings, an axle spindle extending outwardly from the tubular member, a tie bar mounted at one side of the tractor having its rear end connected therewith, a downwardly directed pivot spindle formed at the front end of said tie bar, said pivot spindle being extended through the openings in the bearings and the bore of the tubular member therebetween to pivotally connect the axle spindle with the link bar, a furrow engaging disk rotatably mounted on the axle spindle, an arm fixed to and extending transversely from the tubular member, a bar connecting the outer end of said last mentioned arm to the link bar to restrain turning of the tubular member about the pivot spindle, and means connected to the forward end of the tie bar and operative from a position rearwardly thereof for raising and lowering the disk.

CLARENCE C. TOELLE.